Sept. 25, 1934.   C. H. WILKES ET AL   1,975,031
PROCESS OF MAKING SANDWICH ROLLS
Filed March 24, 1932   3 Sheets-Sheet 1
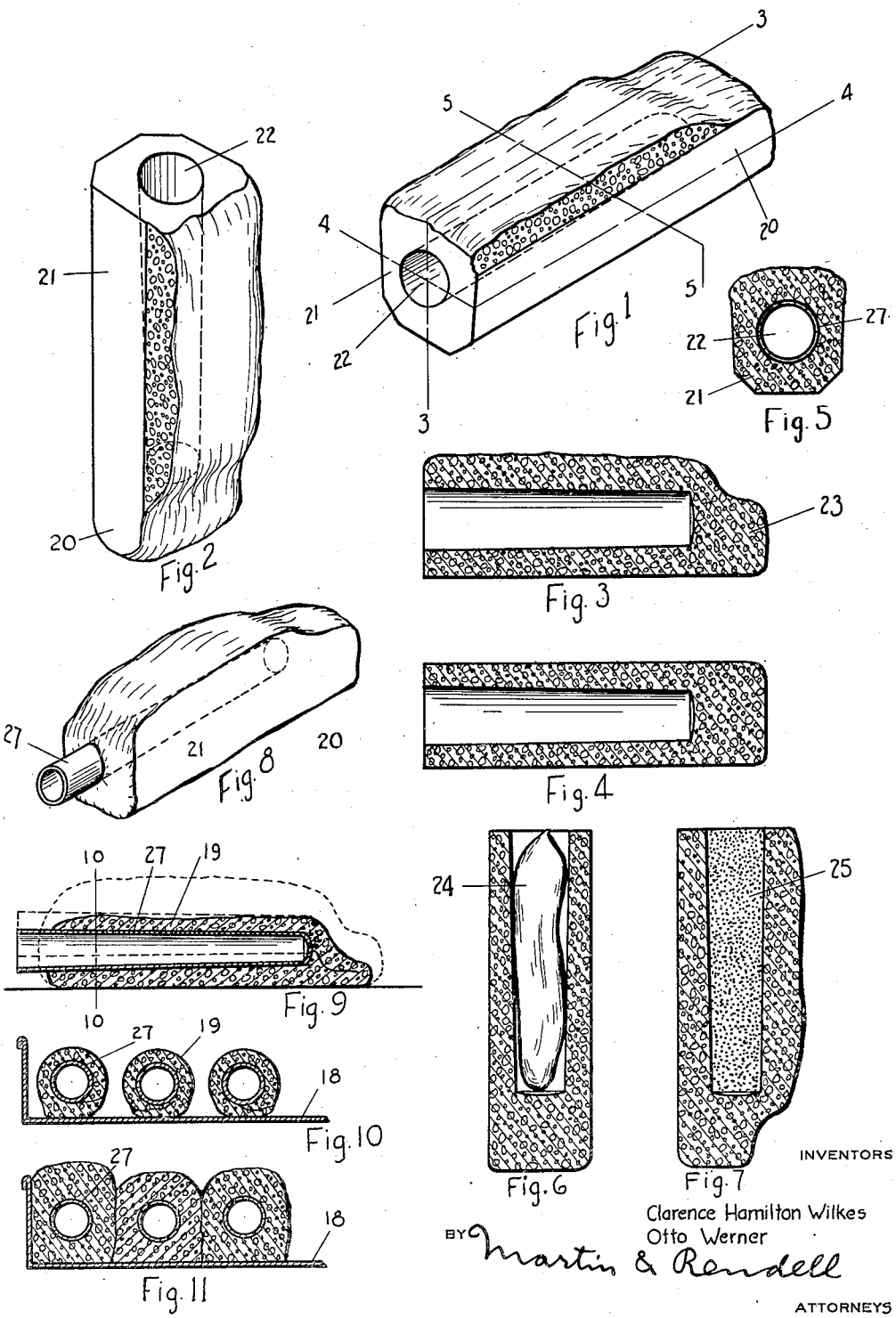
INVENTORS
Clarence Hamilton Wilkes
Otto Werner
BY Martin & Rendell
ATTORNEYS

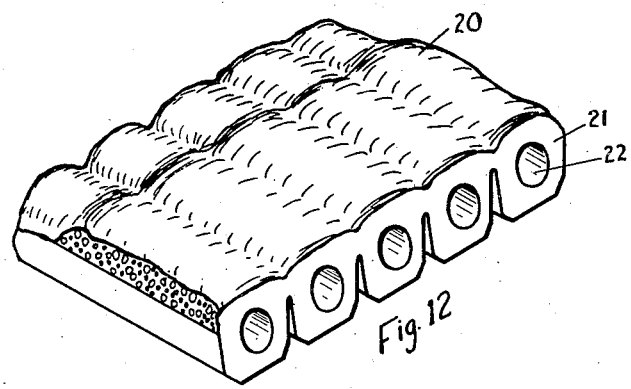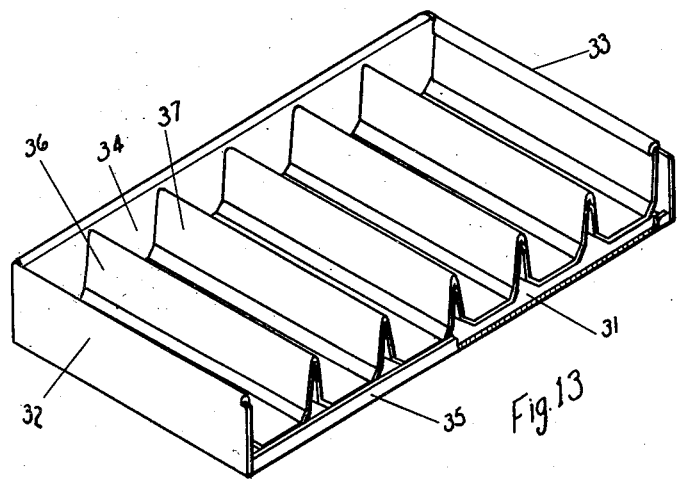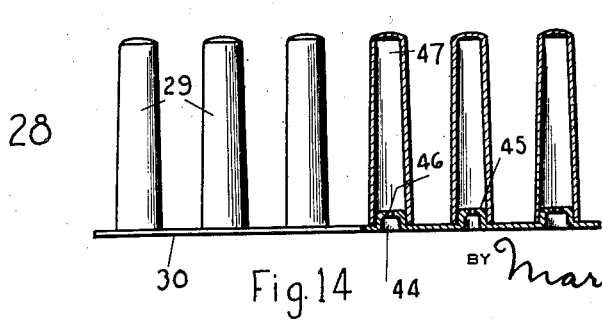

Sept. 25, 1934.  C. H. WILKES ET AL  1,975,031
PROCESS OF MAKING SANDWICH ROLLS
Filed March 24, 1932  3 Sheets-Sheet 3
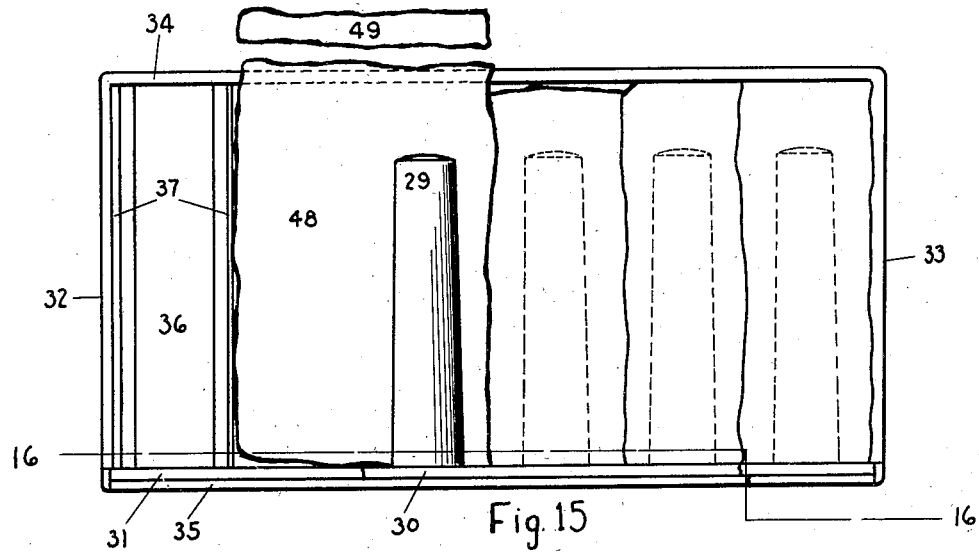
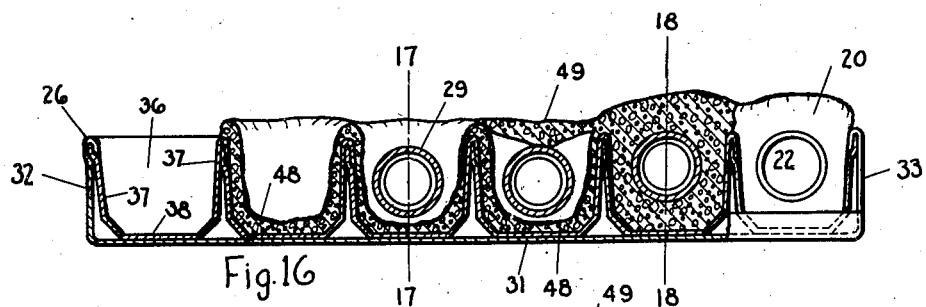
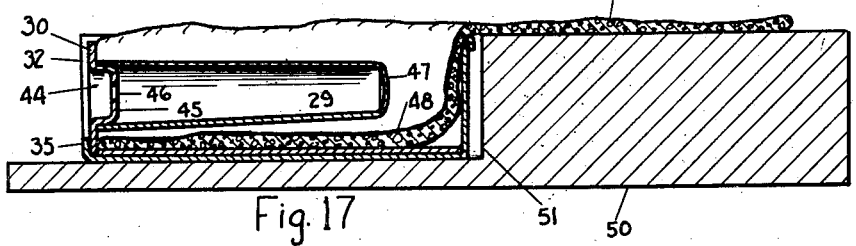
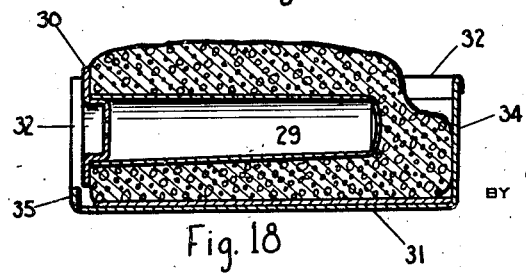
INVENTORS
Clarence Hamilton Wilkes
Otto Werner
BY Martin & Rendell
ATTORNEYS Patented Sept. 25, 1934

1,975,031

UNITED STATES PATENT OFFICE 1,975,031

PROCESS OF MAKING SANDWICH ROLLS

Clarence Hamilton Wilkes, Gloversville, and Otto Werner, Johnstown, N. Y.; said Wilkes assignor to said Werner Application March 24, 1932, Serial No. 600,958

2 Claims. (Cl. 107—54)

Our present invention relates to sandwich rolls and the process of making the same.

The purpose of our invention is to provide a new, improved and useful form of sandwich roll and also to point out a new and improved process of making such sandwich rolls.

Commonly heretofore sandwiches have been made by cutting into or breaking into the side of an elongated roll enough to place the desired filling into the cut. This method of making a sandwich is very unsatisfactory because the opening up of the roll enough to place therein a substantial filling (as distinguished from a thin layer of butter) distorts the roll so that it often breaks at the other side and in any event leaves the open side wide open as well as leaving both ends wide open for the filling to drop therefrom while the sandwich is being handled or eaten. A step beyond that way of making a sandwich from a roll has been to make and bake the roll with a recess or opening in one longitudinal side of the roll. This method provides a recess for the filling without breaking or distorting the roll but still has the fatal defect of the sandwich being open through one long side and both ends of the sandwich so that the filling would easily drop therefrom. A further defect in either of the forms of sandwiches above mentioned is that as soon as a person begins to press any part of the two halves of the roll together as happens when a person begins to eat such a roll, the pressure so exerted upon the filling forces any loose or semi-liquid or non-solid filling out from between other parts of the roll. It is a notorious fact that the first bite into a sandwich roll made by either of the above methods sends a stream of mustard off of the hot frankfurter out of the roll at both corners of the mouth and the first or second bite out of a salad or other semi-solid sandwich produces a widely distributed spray of such loose filling out of the rest of the open side and both open ends of the sandwich. To overcome the above and other well-known disadvantages in sandwich rolls and process of making the same is the main object of this invention. To this end we have devised a new form of sandwich roll where the roll is specially formed and baked so as to be in the shape of a more or less cylindrical tube with one end closed. In this way a sandwich may be made of any desired filling, solid, semi-solid, liquid or very juicy, without danger of spilling the same simply by holding the roll with its open end upward and placing the filling into the open end of the tube. The sandwich can then be placed on exhibition, handed around and eaten without danger of spilling its contents or squirting its loose juice therefrom because the new form of roll can be filled, handled and eaten with its open top upwardly. A person can begin eating from the top of such a sandwich and take successive bites from the remaining sandwich until it is all gone without danger of losing the contents or spilling it over his own clothes or that of his neighbors.

A further purpose of this invention is to provide a sandwich roll of the class described which is integrally formed and allowed to raise and is then baked so as to form an integral cylindrical or tubular roll which is closed at one end and in the preferred form with such end closure extending part way longitudinally of the roll so as not only to form an imperforate closure but also to form a part which serves as a convenient handle at the lower end of the roll for holding the remaining roll with its open end upward.

A further purpose of our invention is to point out an improved and the preferred method or process of forming a roll having the characteristics above mentioned.

Further purposes and advantages of our invention will appear from the specification and claims herein.

Fig. 1 is a perspective view of a roll embodying both the product and process of our invention.

Fig. 2 is a perspective view of said roll positioned with its open end upward.

Fig. 3 is a longitudinal vertical section on line 3—3 of Fig. 1, and Fig. 4 is a similar view on line 4—4 of Fig. 1.

Fig. 5 is a transverse vertical section on line 5—5 of Fig. 1.

Fig. 6 is a central longitudinal sectional view similar to Fig. 4 through a roll such as shown in Figs. 1 to 5 in which has been placed a frankfurter or the like.

Fig. 7 is a view similar to Fig. 3 of such a roll which has been provided with a soft or semi-solid filling such as chopped meat, salad, soft cheese, jelly, fruit, peanut butter or the like.

Fig. 8 is a perspective view of a baked roll embodying this invention showing the core which makes the recess in the roll still in the roll.

Fig. 9 is a longitudinal vertical sectional view of the core and dough as used by one method of our invention to form the roll as shown in Fig. 8, the position of the parts after baking being indicated in dotted lines.

Fig. 10 is a transverse sectional view on line

10—10 of Fig. 9 through the dough and cores used for making several rolls.

Fig. 11 is a similar sectional view of the parts shown in Fig. 10 after the dough has risen and been baked.

Fig. 12 is a perspective view of part of a series of several rolls as made by a modified and somewhat more elaborate process and commercially by the apparatus shown in Figs. 13 and 14.

Fig. 13 is a perspective view of a trough-equipped baking pan 26 which may be used to form rolls embodying our invention in a set as shown in Fig. 12.

Fig. 14 is a view partly in plan and partly in horizontal section of the core member 28.

Fig. 15 is a top plan view of said apparatus namely the pan and core member on a slightly larger scale, but with portions of certain parts removed to more clearly show the construction and with the dough in several positions to more clearly illustrate the steps of the method or process of making rolls embodying our invention by the use of this apparatus.

Fig. 16 is a vertical sectional view on line 16—16 of Fig. 15, the different trough sections of the apparatus illustrating the successive steps in the making, raising and baking of the roll. Figs. 17 and 18 are detail sectional views.

Referring to the drawings in a more particular description, the sandwich roll illustrated in Figs. 1 to 7 approximates the size and shape of a fair-sized roll which is much longer than its height or width as seen in Fig. 1 and which in form is tubular; that is, the greater part of the body 20 of the roll is in the form of a hollow portion or tubular portion 21 by reason of being provided with a deep recess or pocket 22 conveniently circular in cross section and extending from one end of the roll lengthwise thereof for approximately three-quarters the length of the roll. Beyond this hollow or tubular portion the body of the roll is solid, that is its sides or its top and bottom portions approach and merge forming a solid end 23 which preferably as shown in Figs. 1 to 3 and 7 is of less height than the rest of the roll and adapting this solid portion to serve as a handle particularly during the eating of the last part of the roll when it has been converted into a sandwich roll having a soft filling. For the purpose simply of illustration and definiteness of description, but without limiting in any wise the size in which such rolls may be made, it may be stated that a practical form and proportion for such roll when it is to be used for a Frankfurter sandwich or for a substantial sandwich having any other filling is to have the roll about six inches long, about two inches wide, about two inches high through the hollow part of the roll with the recess or pocket 22 about four and one-half inches long and with said recess or pocket centrally located in the said roll and about one inch in diameter at the open end of the roll and tapering to be about seven-eighths of an inch in diameter at the farther or interior end of the pocket.

It will be seen that this roll is roughly in the form of a cylinder or tube having relatively thick walls and with such cylindrical or tubular part closed at one end by a substantial and integral part of the roll and that this closed or solid end of the roll is preferably longer in extent measured longitudinally of the roll than the thickness of the relatively thick side walls of the cylindrical or tubular part of the roll. It will be seen furthermore that by turning the roll from its making and baking position as shown in Figs. 1 and 3 to its upright position as shown in Figs. 2, 6 and 7, the roll provides an open-topped recess or pocket securely closed at its sides and bottom, with said recess of sufficient capacity to receive a substantial filling either of a solid material 24 as a Frankfurter or other piece of meat as seen in Fig. 6 or to receive a semi-liquid filling 25 such as salad, jelly, soft cheese, juicy fruit, peanut butter or the like as seen in Fig. 7. A sandwich so made from one of our rolls by being kept in such upright position may be stored or exhibited or handled and eaten without danger of the mustard dropping from the Frankfurter or the salad dressing or gravy dropping away from the meat of the sandwich and without danger of any part of the soft filling of a soft sandwich dropping or spilling out of the sandwich. A person in eating a sandwich will naturally take successive bites from the top of the sandwich thus consuming the successive adjacent portions of the filling and side walls of the sandwich. A person eating such a sandwich can thus take plenty of time to eat the same in a reasonable manner without fear of loosing much of the contents or spilling any of the contents over his or her clothing or the clothing of those near by.

The lower solid end of the roll is made solid for an appreciable part of the length of the roll in order to form a strong bottom that will not break during handling or eating of the roll. Furthermore, preferably this solid portion is made of less thickness as seen in Figs. 1, 2, 3 and 7 so as to provide a more convenient handle at the lower end of the roll whereby the sandwich made therefrom may be the more easily held between the fingers and thumb both in filling the sandwich and eating the same.

Figs. 8—11 inclusive illustrate the simplest method and the simplest apparatus that can be followed and used respectively in making a sandwich roll embodying our invention. In this form of our process there is used a separate core 27 about the sides and one end of which a piece of dough 19 is wrapped as indicated in Figs. 9 and 10. This core 27 is formed of any suitable material proper for contact with the unbaked dough and that will stand the chemical action of the raising of the dough and the action of heat in the baking of the dough into a roll. Conveniently the core is in the form of a tube closed at one end, the tube being preferably circular in cross section and of as light-weight metal as possible in order not to disturb or prevent to any improper extent the raising of the dough. Preferably also this core will be formed with a slight taper so as to slope gradually to be smaller at its closed end which is the end within the roll as seen in Figs. 8 and 9. This tapering formation of the core aids in withdrawing the core from the roll after the roll has been baked. In using this form of process of our invention and this simple separate core 27, the piece of dough 19 is wrapped around the core in any way so as to cover the smaller end of the core and leave the larger end of the core projecting beyond the dough more or less in the position as shown in Fig. 9. Ordinarily, the overlap of the dough will be in the lower half or bottom portion of the roll and more or less below the core as shown in different ways in Fig. 10 so that the weight of the dough and the slight weight of the core helps to close up the overlapping joint of the dough and make the wall of the recessed roll really integral by the time the dough has raised and has been baked. With this simple form of the process of our invention the different portions of dough, each encircling a core, are placed on the bottom of an ordinary flat-bottomed baking pan 18 with the said units ordinarily spaced slightly away from each other as suggested in Fig. 10. Then as the dough expands in the raising and baking, the dough not only raises upwardly but expands laterally so that the dough of one roll lightly contacts with the dough of an adjacent roll so as to form more or less vertical walls for separate rolls but with these vertical walls brought into engagement with each other late enough in the process of the raising of the dough so that the rolls when baked may be readily broken apart at these contacting faces without requiring sufficient force to break or distort the pocketed rolls. Obviously, by spacing the units of dough closer together the rolls will be forced to raise farther and be of greater height relatively. Conversely, by spacing the units of dough farther apart upon the pan more opportunity will be given for the roll to expand laterally and more outside crust will be present in the baked article which will then be more or less of a hard-baked or crusted roll. In this method and with this apparatus as well as in the more elaborate method and apparatus hereinafter described, there will preferably be left a considerable portion of the dough in two layers beyond the closed or small inner end of the core so as to give a considerable thickness to the closure of the roll below the pocket when the roll is raised to an upright or using position.

The process and apparatus illustrated in Figs. 8-11 just described is not broadly available for all forms of dough and all forms of rolls, but is limited in its use to a few certain types of rolls and a few definite kinds of dough where the slight weight of the separate core 27 can be taken by the dough without the core preventing the dough from raising and without the otherwise unsupported core unfavorably affecting the shape or quality of the completed roll. For general or universal use with ordinary dough and for the making of acceptable forms of sandwich rolls we have found it necessary to provide a more elaborate apparatus and particularly an apparatus wherein the core is supported at the proper height within the roll above the layer of dough therebelow and preferably also at a height spaced a little above the dough so as not to interfere with the initial raising of the dough. In our preferred form of apparatus and method we have found it necessary also to provide for the core being allowed to rise upwardly as the dough raises so as not to unfavorably affect the raising of the roll being formed by the use of such a core.

The apparatus that may be used in the making of all sandwich rolls by this more elaborate and preferred embodiment of the process of our invention is the subject-matter of a separate copending application made by us and filed March 14, 1932 as Serial No. 598,710. The illustration and a brief description of that apparatus, however, is necessary in order to illustrate and clearly describe the said preferred form of our process.

Figs. 13-18 show the apparatus used and the steps followed in this method of baking rolls wherein means are provided for initially supporting the core in the roll without the portion of dough below the core carrying the weight of the dough and in the preferred form where also the core can move upwardly if necessary during the latter part of the raising and baking of the dough into a roll.

Fig. 14 shows the core member 28 and Fig. 13 shows the pan 26 which together form the apparatus. The core member 28 is formed of a plurality of cores 29 preferably separately constructed and of a shape similar to the cores 27 already described, but these cores 29 are permanently attached at their larger end to the core plate 30. The said core member is illustrated as having the core 29 attached to the core plate by providing upon the core plate cup-shaped bosses 44 projecting for a short distance into the larger and open ends of the cores 29. The bottoms 45 of the bosses are preferably provided with a small aperture 46 therethrough. The smaller ends of the cores are sealed with a closure 47.

The pan 26 has a bottom 31, opposite sides 32 and 33, a back 34 as high as the sides 32 and 33 and a front 35 which is much lower than the said sides and back as appears particularly in Figs. 13, 17 and 18. In this pan is placed and permanently fixed a set of troughs 36 generally U-shaped in cross section with the sides 37 of adjacent troughs uniting at a line nearly on the level of the upper edge of the sides 32 and 33 and the back 34 of the pan. These troughs fit close to the back 34 of the pan but the front ends of the troughs are spaced from the low front 35 a little greater distance than the thickness of the core plate 30. By reason of this construction when the core member is placed in the pan with the cores 29 projecting lengthwise of their respective troughs 36 the cores 29 will be held practically parallel with the bottom of the troughs and an appreciable distance above the bottom of the troughs. The holding of the core member in this position will be effected through the bottom of the core plate 30 setting down against the bottom of the pan 26 into the space between the front ends of the troughs 36 and the low front 35. The front edges of the troughs will bear against the inside surface of the core plate 30 and the inward face of the low front 35 will bear against the outer face of the core plate towards its bottom about as is particularly shown in Figs. 15 and 17. It will be seen furthermore that the engagement of the core plate between the front edges of the core and the front ends of the troughs and the rear side of the low front 35 is a sliding engagement so that as the dough raises into contact with the cores of the core member and then raises further the cores will bodily be raised and the core plate will likewise rise therewith vertically. After the core plate has risen a distance equal to the clear height of the low front 35 the core plate will not be supported at its front by said front 35 but by that time the raising of the dough in the set of rolls will have proceeded far enough to be strong enough to hold the cores parallel in the rolls.

It will be understood of course that in the construction of the pan 26 and the core member 28, the troughs 36 will be similar in number to the cores 29 of the core member and that the cores will be spaced so as to fit into the central portion of the troughs and that the cores 29 will be shorter than the troughs 36 for the purpose already mentioned. Means are also provided in the apparatus to make the cores 29 register or center in the troughs 26. The simplest form of such means is to have the opposite sides 32 and 33 of the pan project forwardly beyond the front ends of the troughs so that the opposite ends of the core plate 30 have to slide down between the projecting forward ends of the said pan sides 32 and 33.

The first step in the preferred or full embodiment of our method invention is to place over the whole pan and its troughs 36 the lower layer 48 of dough. This piece of dough extends from side 32 to side 33 of the pan and from front to rear of the troughs in the pan but not beyond the front end of the troughs and this lower layer of dough is so manipulated as to settle down into the different troughs more or less as indicated in the second and third troughs counting from the left as seen in Fig. 16. In other words, the dough rests upon the upper edge of the sides 37 of each trough and then extends down both sides 37 of each trough and across the bottom of the trough.

Then the removable and replaceable core member 28 is placed above the pan in the assembled position already mentioned so that each core 29 projects along its corresponding trough from the front towards the rear thereof but spaced above the lower layer of dough even at the bottom of the trough as clearly appears in the third and fourth troughs of Fig. 16 counting from the left. The placing of the core member 28 in this position brings the core plate 30 against and within the front of the pan and closes the front of the pan even above the low front 35 so that the dough in raising or baking cannot expand towards the front. As seen in the third trough of Fig. 15 the rear end of each core 29 does not reach to the rear end of the trough. The next step is to place over the assembled parts of the apparatus and the lower layer of dough the upper layer 49 of dough. This will be done so as to result in a positioning of the dough more or less as shown in the fourth trough counting from the left in Fig. 16. In other words, the upper layer of dough will rest directly upon and in contact with the lower layer of dough at the upper parts of the trough sides 37 so as to make an integral or merged joint of two layers of dough along those lines and from those lines inwardly to the core as the dough raises and is baked and as is shown more or less diagrammatically in the fifth trough of Fig. 16. When this upper layer 49 of dough is placed over the cores in the lower layer of dough the dough of the upper layer of each roll will raise and be supported upon the upper part of its core. In the raising of the dough the lower layer will raise upwardly and towards the core from each side of each trough and the upper layer 49 of the dough will expand out to fill the space perhaps moving downwardly somewhat to thoroughly merge with the lower layer.

As the separate cores 29 do not reach to the rear end of the troughs, the placing of the upper layer 49 of the dough over the rear end of the trough will allow this rear strip of the upper dough to sag downwardly into the troughs and into direct contact with the upper surface with the lower layer of dough to the rear of each core. This forms the basis of the solid integral and well merged rear end of the roll when in baking position or which solid end forms the thinner lower end or handle for the roll when in upright position.

As already mentioned, the core member is supported in the pan so that the cores do not sag against the dough but so that the core member can move upwardly when the raising of the dough has proceeded far enough to effect such motion. Such an upward position of the core member is indicated diagrammatically by the core in the fifth trough of Fig. 16 counting from the left. It will be understood that the showing in Figs. 15 and 16 are diagrammatical to illustrate successive positions of the parts and successive steps in the operation. Particularly it is to be noted that the upward position of the core indicated in the said fifth trough of Fig. 16 suggests the upward position of the whole core member and does not mean that the individual cores move separately. The placing and holding of the cores above the upper surface of the lower layer of dough allows an initial raising of the lower layer of dough before its raising will be at all affected by coming into contact with the core. This insures sufficient raising of the dough even below the core to maintain the palatability of the portion of the roll even below the core. After such partial raising of the dough there is strength enough in the dough to raise the cores without holding back the raising of the dough.

With the two parts of the apparatus thus assembled and with the two layers of dough placed therein and in contact with each other as described the dough will be allowed to raise in the usual way with the core member in place in the pan and then with the core member still in place in the pan the dough will be baked. Immediately after the baking process has been completed the core member 28 will be removed from the set of rolls in the pan by withdrawing the cores longitudinally straight forward from the rolls by grasping the core plate and pulling outwardly thereupon.

Fig. 17 which is a sectional view on line 17—17 of Fig. 16 shows the original position of the core member in the pan.

Fig. 18 which is a vertical sectional view longitudinally of the trough on line 18—18 of Fig. 16 shows the position of the core member after the raising and baking of the dough have proceeded far enough to move the core member bodily upwardly the ordinary distance which will be enough to raise the extreme bottom edge of the core plate above the level of the upper edge of the low front 35 of the pan. This position will be maintained to the end of the baking so that immediately after the baking has been completed the core member may obviously be removed from the rolls by pulling straight forward on the core plate. During this withdrawal of the core member usually the rolls will remain in the pan and the narrow front 35 forms a stop bearing against the front of each roll below the core down to the bottom of the roll to prevent the rolls from moving longitudinally of themselves or forwardly of the pan when the core member is withdrawn.

The position of the parts at this stage of the proceeding is shown diagrammatically in the sixth or extreme right hand trough of Fig. 16 which shows a front view of a baked roll with the core removed therefrom. After the core member has been thus removed from the set of rolls the rolls will be removed preferably bodily in any desired manner from the pan. As is suggested, between the fourth, fifth and sixth troughs, counting from the left in Fig. 16, there is an appreciable thickness of the roll between the top of the said set of rolls over the top edge of the sides 37 of the troughs. This thickness of the baked dough is sufficient to hold the rolls together for removal, transporting and selling but is still a narrow enough zone so that any roll may be readily broken from its adjacent roll in an obvious manner without breaking or distorting either of the rolls.

In Figs. 15 and 17 there is illustrated what we believe to be the preferred form of placing the dough in the pan by having a single piece of dough large enough to form the bottom layer 48 and also the upper layer 49 of dough, the upper layer being temporarily extended to the back of the pan until the core member is placed in position and then the upper layer is swung forwardly into position. With this method a stepped platform 50 may be used having the upper surface of the rear portion about on a level with the upper edge of the back of the pan as illustrated in Fig. 17. The back of this platform then provides a surface for temporarily resting the upper layer of dough while the core member is being placed in position. If desired, however, the two layers of dough may obviously be separate pieces with the upper layer placed directly over the core when brought to the pan.

A still further and third method of handling the upper layer is to place one end of the pan against the upright step 51 of the platform 5 and have the extra piece of dough extend over the end of the pan next to the step 51 onto the upper level of the platform 50. The core member will then be placed in position as already described and the upper layer of dough 49 will be brought from the end instead of from the back of the pan and fitted down into contact with the dough at the sides of the trough and against the supper surface of the dough of the lower layer at the rear of the different cores.

What we claim as new and desire to secure by Letters Patent is:

1. The process of making a sandwich roll in the shape of a complete integral tube closed at one end which consists in providing an open-topped trough-like pan, placing a thin layer of dough across the pan with the dough extending up the sides of the trough, placing a core shorter than the trough in the trough of the pan above the dough therein with one end of the core even with one end of the trough and with the other end of the core spaced from that end of the trough and then placing a thin layer of dough over said core and touching the raised longitudinal portions of the lower layer of dough and resting upon the lower layer of dough at the end where the core is spaced from its end of the trough, allowing the dough so positioned to raise and then baking the dough so positioned.

2. The process of making a sandwich roll in the shape of a complete integral tube closed at one end which consists in providing an open-topped trough-like pan, placing a thin layer of dough larger than the pan across the pan with the dough extending up the sides of the trough and with the extra dough extending beyond one edge of the pan, placing a core shorter than the trough in the trough of the pan above the dough therein with one end of the core even with one end of the trough and with the other end of the core spaced from that end of the trough and then folding said extended piece of dough back over said core into contact with the said raised longitudinal edges of the lower layer of dough and into contact with the upper surface of the lower layer beyond said spaced end of the core, allowing the dough so positioned to raise and then baking said dough so positioned.

CLARENCE HAMILTON WILKES.
OTTO WERNER.